(12) United States Patent
Ryan et al.

(10) Patent No.: US 7,634,467 B2
(45) Date of Patent: Dec. 15, 2009

(54) IMPLICIT, SPECIALIZED SEARCH OF BUSINESS OBJECTS USING UNSTRUCTURED TEXT

(75) Inventors: Patricia A. Ryan, Seattle, WA (US); John C. Platt, Redmond, WA (US); Glen H. Anderson, Woodinville, WA (US); Gina Venolia, Bellevue, WA (US); Bob Vogt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/555,228

(22) Filed: Oct. 31, 2006

(65) Prior Publication Data

US 2008/0104052 A1 May 1, 2008

(51) Int. Cl.
*G06F 17/30* (2006.01)
*G06F 7/00* (2006.01)

(52) U.S. Cl. ............ 707/3; 707/5; 707/6; 707/104.1; 709/206

(58) Field of Classification Search ............ 707/1–7; 709/206
See application file for complete search history.

(56) References Cited

U.S. PATENT DOCUMENTS

| | | | |
|---|---|---|---|
| 6,185,550 B1 * | 2/2001 | Snow et al. | 707/1 |
| 6,278,996 B1 * | 8/2001 | Richardson et al. | 707/6 |
| 6,424,997 B1 * | 7/2002 | Buskirk et al. | 709/206 |
| 6,574,617 B1 * | 6/2003 | Immerman et al. | 707/1 |
| 6,718,368 B1 * | 4/2004 | Ayyadurai | 709/206 |
| 6,883,014 B1 * | 4/2005 | McErlean | 709/202 |
| 6,941,304 B2 * | 9/2005 | Gainey et al. | 707/10 |
| 7,275,083 B1 * | 9/2007 | Seibel et al. | 709/206 |
| 7,296,058 B2 * | 11/2007 | Throop | 709/206 |
| 2003/0055668 A1 | 3/2003 | Saran et al. | |
| 2003/0065558 A1 | 4/2003 | Shaw et al. | |
| 2003/0145057 A1 | 7/2003 | Throop | |
| 2004/0059712 A1 * | 3/2004 | Dean et al. | 707/1 |
| 2004/0078802 A1 | 4/2004 | Hammer et al. | |
| 2004/0093566 A1 | 5/2004 | McElligott | |
| 2004/0122730 A1 * | 6/2004 | Tucciarone et al. | 705/14 |
| 2004/0181417 A1 * | 9/2004 | Piller et al. | 705/1 |
| 2004/0249695 A1 | 12/2004 | Clark et al. | |
| 2004/0260770 A1 | 12/2004 | Medlin et al. | |
| 2006/0015479 A1 | 1/2006 | Wood et al. | |

FOREIGN PATENT DOCUMENTS

WO   WO0237311 A2   5/2002

OTHER PUBLICATIONS

"Business Portal," MicrosoftDynamics GP, © 2005 Microsoft Corporation, http://download.microsoft.com/download/1/7/c/17ce9776-68e1-44a4-af55-9fdedba7ab5a/GP_BusPortal.pdf.

(Continued)

*Primary Examiner*—Kuen S Lu
*Assistant Examiner*—Michelle Owyang
(74) *Attorney, Agent, or Firm*—Perkins Coie LLP

(57) ABSTRACT

A method and system for providing business context corresponding to unstructured documents is provided. A business context correlation system analyzes the contents of a user's unstructured document, identifies the business context of the unstructured document from the analyzed contents, and presents the business context along with the unstructured document to the user. The business context includes the relevant contextual objects and documents associated with one or more business applications. Providing a view of the business context along with the unstructured document allows the user more fully understand and act on the displayed document.

17 Claims, 7 Drawing Sheets

OTHER PUBLICATIONS

Abrol, Mani et al., "Navigating large-scale semi-structured data in business portals," Proceedings of the 27th VLDB Conference, Roma, Italy, 2001.

Clack, Chris et al., "Autonomous Document Classification for Business," http://www.acm.org/sigart/proceedings/agents97/A044/A044.html, [last accessed Jul. 5, 2006].

* cited by examiner

IMPLICIT, SPECIALIZED SEARCH OF BUSINESS OBJECTS USING UNSTRUCTURED TEXT

BACKGROUND

Electronic communications, such as electronic mail (email) communications, instant messaging (IM) communications, phone communications, etc., are increasingly becoming the primary communication vehicle for many corporations and business enterprises due to its many advantages over non-electronic communications such as postal mail. These advantages include convenience, low cost, rapid delivery, ease of storage, and so on.

The increasing dependence on electronic communications is resulting in an ever increasing volume of electronic communications occurring in the workplace. For example, in the case of email communications, as the volume of ad-hoc email communications increases, business decisions makers are becoming faced with the problem of efficiently managing their businesses while dedicating more of their time working within various email applications, such as MICROSOFT OUTLOOK. These business decision makers are spending large parts of their day working within the email applications sorting through the uncorrelated ad-hoc email communications. This is because these email applications do not adequately enable the business decision makers to quickly determine the relevant context of the ad-hoc email communications. Accordingly, the business decision makers are unable to appropriately act upon the received email communications. Further compounding the problem is that the business decision makers typically use email communications to request additional, relevant context from the senders of the ad-hoc email communications. This results in additional email communication replies that further exacerbate the amount of time spent by the business decision makers working within the email application in trying to determine the relevant context of the ad-hoc email communications.

SUMMARY

A method and system for providing business context corresponding to unstructured documents is provided. A business context correlation system analyzes the contents of a user's unstructured document, identifies the business context of the unstructured document from the analyzed contents, and presents the business context along with the unstructured document to the user. The business context includes the relevant contextual objects and documents associated with one or more business applications. Providing a view of the business context along with the unstructured document allows the user more fully understand and act on the displayed document. For example, the business context correlation system may search a user's unstructured document, such as, by way of example, the user's electronic mail ("email") message and attachments, for relevant or key terms, classify the relevant terms into one or more actions related to business objects associated with one or more business applications, and suggest or present the actions to the user for possible execution. The business context correlation system may also classify the relevant terms into a document category (i.e., use the relevant terms to predict or determine a classification for the unstructured document), identify a work-flow process that is associated with the document category, and suggest or present a task in the work-flow process to the user for possible execution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
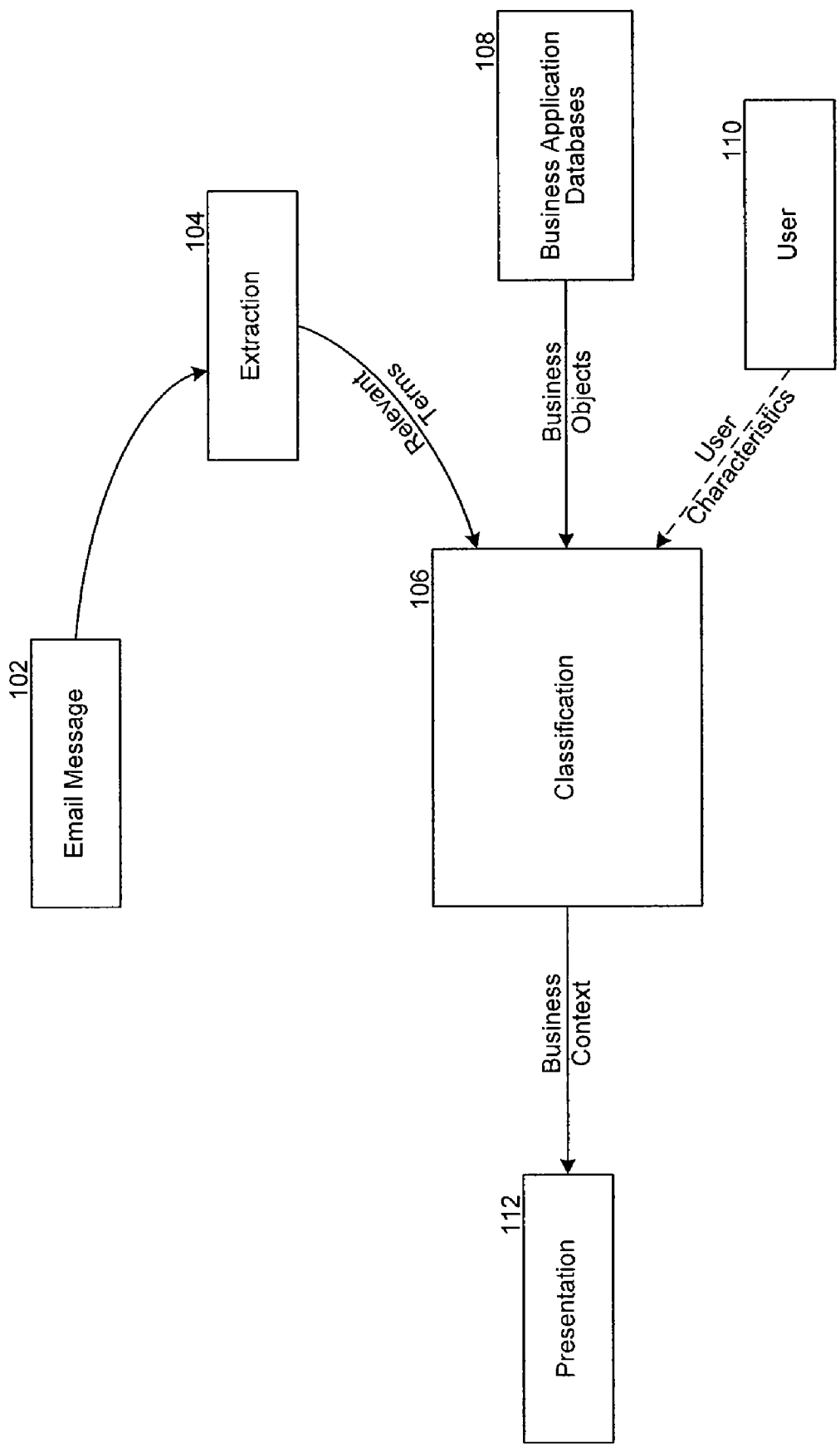
FIG. 1 is a block diagram that conceptually illustrates the processing of the business context correlation system, according to some embodiments.

A method and system for providing business context corresponding to unstructured documents is provided. In some embodiments, a business context correlation system analyzes the contents of a user's unstructured document, identifies the business context of the unstructured document from the analyzed contents, and presents the business context along with the unstructured document to the user. The business context includes the relevant contextual objects and documents associated with one or more business applications. Providing a view of the business context along with the unstructured document allows the user more fully understand and act on the displayed document. For example, the business context correlation system may search a user's unstructured document, such as, by way of example, the user's electronic mail ("email") message and attachments, for relevant or key terms, classify the relevant terms into one or more actions related to business objects associated with one or more business applications, and suggest or present the actions to the user for possible execution. The business context correlation system may also classify the relevant terms into a document category (i.e., use the relevant terms to predict or determine a classification for the unstructured document), identify a work-flow process that is associated with the document category, and suggest or present a task in the work-flow process to the user for possible execution. In this manner, the business context correlation system determines a classification of an unstructured document using the relevant terms from the unstructured document, and provides business context corresponding to the unstructured document based on the classification.

The business context correlation system provides a classification system for classifying the unstructured documents into the defined actions and document categories. The classification system contains a set of classifiers, where each classifier corresponds to a defined action or document category. Each classifier maps the relevant terms from an unstructured document into a yes/no decision on whether the corresponding action or document category applies to the unstructured document. To create a learned classification system, a knowledgeable person, such as a system developer, first defines or crafts a set of actions and document categories, along with their parameters. The system developer also collects a training set of unstructured documents. For example, the training set may include unstructured documents created based on actual unstructured documents used by real vendors, customers, business, etc. The system developer can then assign each unstructured document in the training set to one or more of the defined actions and document categories. The system developer can also correlate the business objects (e.g., customer names, product names, stock keeping units, etc.) from the business application databases with the unstructured documents in the training set. Once the unstructured documents are labeled (i.e., assigned to the respective actions and/or document categories), the system developer can apply any of a variety of well-known learning algorithms to the training set to create a classifier for each action or document category. Examples of learning algorithms include linear support vector machines, logistic regression, boosted decision trees, Naive Bayes models, Bayes networks, and other learning models. Learning algorithms operate by adjusting the parameters in a classifier to predict the labels of the training set. A classifier takes as input a feature vector (e.g., a bit vector, where each bit corresponds to the presence or absence of a feature, such as a relevant term, canonicalized feature such as a CUSTOMERNAME, a social relationship, etc.), assigns a weight or value to each present or "on" bit based upon the learning algorithm applied to create the classifier, and computes a weighted sum for the input feature vector. The calculated weighted sum can then be used to determine whether the action or document category corresponding to the classifier applies to the unstructured document from which the feature vector was created.

In general terms, the defined actions and document categories each address a common information need, which may be obtained from the business objects associated with one or more business applications. Business objects are typically maintained in business application databases and include, by way of example, customer objects (e.g., objects corresponding to information regarding customers, such as customer name, customer address, customer contacts, etc.), vendor objects (e.g., objects corresponding to information regarding vendors, such as vendor name, vendor address, vendor contacts, etc.), inventory objects (e.g., objects corresponding to information regarding inventory levels of specific products), work order objects (e.g., objects corresponding to information regarding received orders), report objects (e.g., objects corresponding to reports, such as sell-through reports for various products, financial reports for various customers and vendors, payment history reports for various customers, etc.), and other objects that are maintained by the business applications. An action typically acts on or is related to one or more business objects in the business application databases. The business objects that are related to the action provide the context around the action. For example, an action may be defined to: display a payment history report for a customer; display a report of the recent service calls made by a customer; display a profitability report for a product/product line/vendor/customer; display contact information for a person/contact/vendor/customer; display a sell-through report for a product/product line/vendor's products; display an inventory report for a product; and the like. Actions may contain one or more parameters whose values need to be provided before the actions can be executed against the business application databases to obtain the business objects. For example, in the example action above to display a profitability report for a product, "product" is a parameter whose value needs to be provided in order to execute the action as a query against the business application databases. Continuing the example, assuming that an unstructured document contains the term "Product A" which is a name of a product, the product name "Product A" can be used as a value for the parameter, thus transforming the action to display a profitability report for Product A. Stated differently, the action can map to a query that is conducted against the business application database or databases, and the product name "Product A" can be used to populate the query.

Document categories may be defined to classify or categorize an unstructured document as, by way of example, a vendor purchase order, a customer complaint, a vendor product announcement, a new vendor product announcement, a customer request for product information, a customer visit opportunity, a vendor visit opportunity, a product sales opportunity, an urgent request, and the like. An unstructured document may be classified into one document category or multiple document categories. For example, an unstructured document may be classified as both a vendor product announcement and an opportunity to visit the vendor. The system administrator may also define work-flow processes for the defined document categories. For example, for the example document category customer request for product information, the defined work-flow process may include the following tasks: send the customer brochures describing the specified products; and follow-up with the customer regarding ordering the specified products. Similarly, for the example customer visit opportunity, the defined work-flow process may include the following tasks: view user's schedule on the specified date or dates; identify vendors/customers located near the customer; and contact the identified vendors/customers to arrange appointments/meetings. Upon classifying an unstructured document into a document category, the business context correlation system may identify a task or tasks in the work-flow process associated with the document category to present for possible execution. For example, assuming that an unstructured document is classified as a customer visit opportunity, the business context correlation system may identify the task to contact each of the vendors/customers located near the customer, and present this task, for example, as a control or multiple controls in a user interface (UI), to the user for possible execution. The user can then use the presented controls to execute the task. In another example, the business context correlation system may also identify the task to view the user's schedule on the particular dates, and present this task to the user as a control in the UI. The user can then use the presented control to execute the task, causing a display of his or her schedule on the particular dates. Alternatively, the business context correlation system may identify the task to view the user's schedule on the particular dates, and automatically display the user's schedule on the particular dates in the UI. Similar to actions, tasks may contain one or more parameters whose values need to be provided before the tasks can be executed. For example, in the example task above to view the user's schedule on the particular dates, "dates" is a parameter whose value needs to be provided in order to execute the task. Continuing the example, assuming that the unstructured document is an invitation to visit a customer on Oct. 1 and 2, 2006, Oct. 1 and 2, 2006 can be used as the values for the parameter, thus transforming the task to view the user's schedule on Oct. 1 and 2, 2006. The business context correlation system can then obtain information regarding the user's schedule on these dates from, for example, the user's calendaring application, and display the schedule information in the UI. As another example, in the example task above to send a customer brochures describing the specified products, "customer" and "specified products" are parameters whose values need to be provided in order to execute the task. Similar to the dates, the values for these parameters can be obtained from the unstructured document.

FIG. 1 is a block diagram that conceptually illustrates the processing of the business context correlation system, according to some embodiments. The business context correlation system first opens a user's email message 102, for example, inside an email client application, in order to access the contents of the email message. The contents include the header of the email message (e.g., From:, To: CC:, Subject:, etc.), the body of the email message, attachments, and any other data associated with the email message. The business context correlation system then extracts 104 the relevant terms from the email message. Extraction of the relevant terms is further discussed below. Once the relevant terms (including the features) are extracted from the email message, the business context correlation system summarizes the relevant terms as a long bit vector, where each bit corresponds to the presence or absence of a relevant term or feature. Examples of relevant terms include "back-order," "purchase order," "late," "catalogue," "complaint," "order," "concern," etc. A feature can be a canonicalized feature such as a VENDORNAME, CUSTOMERNAME, PRODUCTNAME, LOCATIONNAME, etc., or an indication of relationship, such as a social relationship, employment title, profession, etc. The business context correlation system then classifies 106 the email message by inputting the bit vector to each classifier in the classification system. Alternatively, the email message can be represented as a vector of floating point numbers or integers, instead of a bit vector. Again, each classifier in the classification system corresponds to an action or document category defined in and supported by the business context correlation system. Each classifier evaluates the input bit vector and may compute a weighted sum for the bit vector. For example, the weighted sum may be a floating point score or other numerical score, where a high score means that the action or document category corresponding to the classifier that generated the score is likely, while a low score means that the corresponding action or document category is unlikely. Having identified the actions and/or the work-flow task or tasks to present to the user, the business context correlation system performs parameter extraction to determine the values for the parameters needed by the actions and work-flow tasks. The parameters for the actions and work-flow tasks are the business objects, such as, by way of example, customer names, vendor names, product names, stock keeping units, etc., which are stored in the business application databases 108. The business context correlation system may have already detected these business objects (e.g., the relevant terms) in the email message, and may have used these business objects in creating the bit vector for the classifiers. For example, if an action is to find the profitability of one or more products, then the business context correlation system can determine the product names (i.e., the value for the parameter "products" in the action) from the names of the products contained in the email message. The business context correlation system may optionally (as indicated by the dashed line) further filter the actions and work-flow tasks to present to the user based on the characteristics of the user 110. For example, not all of the actions and work-flow tasks may be applicable to all of the roles in an organization. A user who is a finance officer for an organization may not be interested in a report concerning customer complaints or service calls. Similarly, a user who is a service representative may not be interested in a report concerning the payment history of a customer. Having determined the actions and/or work-flow tasks to suggest to the user, the business context correlation system presents 112 the business context (i.e., the actions and/or work-flow tasks) corresponding to the email message to the use for possible execution. For example, the business context correlation system may display each action and work-flow task as a control in a task pane of the email client application. When a user selects a displayed action for execution, the business context correlation system can convert the action into a query and execute the query against the appropriate business application database or databases. The business context correlation system can then present the results of the query to the user using, for example, a visualization tool of a client application, such as the client email application. For example, the results of the query can be displayed in a pop-up window of the client email application. Similarly, when a user selects a displayed work-flow task for execution, the business context correlation system can execute the work-flow task and present a report of the results of the work-flow task execution to the user.

In some embodiments, the business context correlation system may allow the user to edit the displayed actions and/or work-flow tasks. For example, the user may edit a parameter of a displayed action to further refine the parameter selection made by the business context correlation system.

In some embodiments, the business context correlation system may apply a predetermined threshold score to each action to determine whether an action should be presented to the user for possible execution. For example, assuming that the predetermined threshold score is five (5), the business context correlation system may presents the actions whose score is equal to or greater than five to the user for possible execution. The business context correlation system may similarly apply the predetermined threshold score to each document category to determine whether the work-flow task corresponding to the document category should be presented to the user for possible execution. If no action or document category score meets or exceeds the predetermined threshold score, the business context correlation system does not present any action or work-flow task to the user. In some embodiments, the business context correlation system may present a predetermined number, such as, by way of example, six (6), of the highest scoring actions and/or document categories that exceed the predetermined threshold score to the user for possible execution.

In some embodiments, the business context correlation system uses a dictionary of terms to extract the relevant terms and features from the email message. The business context correlation system allows for the creation of a master dictionary of terms. The master dictionary of terms contains the vocabulary of the terms that may be relevant in determining the business context of the email message. The master dictionary of terms may include business-related terms, terms specific to types of vertical businesses, terms specific to a job title/role/profession, terms that provide indicia of social relationships, and the like. For example, the business-related terms may be comprised of the names of the objects, including the types of objects, contained in the business application databases, such as names of customers, names of vendors, product names, etc. The terms specific to the types of vertical businesses may be comprised of the terms commonly used in various types of businesses such as oil and gas refining, retail sales of electronic goods, retail sales of footwear, retail sales of perishable goods, and other vertical lines of business. The terms specific to a job title/role/profession may be comprised of the terms commonly used or read by a chief executive officer, a chief technology officer, a banker, a loan consultant, a doctor, a lawyer, an engineer, a salesperson, and other job titles, roles, and professions. When an extraction of a user's email message needs to be performed, the business context correlation system uses the master dictionary of terms to generate a dictionary of terms that is tailored to the user. All of the terms in the master dictionary of terms may not be applicable or relevant to all users. The dictionary of terms tailored to the user contains the terms from the master dictionary of terms that are more relevant to the user's characteristics, such as the user's profession, job title, job role, etc. The characteristics of the user may be determined from the contents of the user's profile. For example, a user who is a vice present of engineering at a computer company may use a different vocabulary than a user who is a loan officer at a bank. As another example, a user who is in the oil and gas industry uses a different vocabulary than a user who is a doctor. The business context correlation system then uses the dictionary of terms that are tailored to the user's characteristics to extract the terms from the user's email message. In this way, the business context correlation system can better control the relevant terms that are extracted from the user's email message.

In some embodiments, the business context correlation system uses natural language processing to extract the relevant terms and features from the email message. For example, the business context correlation system can parse the contents of the email message and extract the noun phrases, names of entities, dates, titles, and other terms that provide indicia of business contexts and social relationships, and use these extracted terms as the relevant terms. In some embodiments, the business context correlation system can use the raw terms from the email message as the relevant terms.

Figure 2:
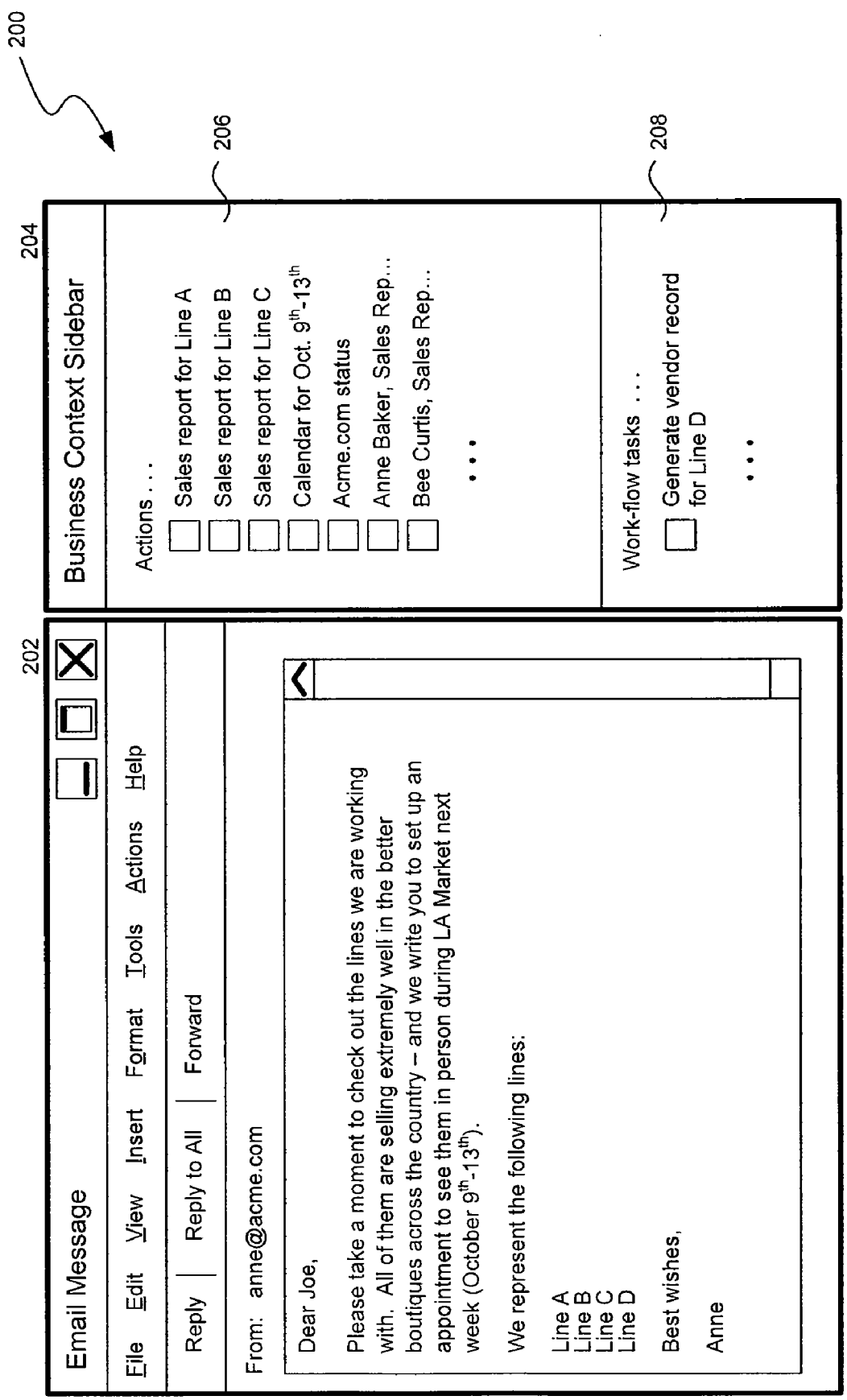
FIG. 2 is a representative user interface that illustrates the display of business context corresponding to an unstructured document, according to some embodiments.

FIG. 2 is a representative user interface that illustrates the display of business context corresponding to an unstructured document, according to some embodiments. A user interface (UI) 200 includes an email message window 202 and a business context sidebar 204. The email message window includes the email message that is being viewed by the user, and which is being processed by the business context correlation system. The email message contains the key terms that are extracted and used by the business context correlation system to determine the business context that is related to the email message. The business context sidebar includes an action display space 206 and a task display space 208. The action display space includes indications of the actions that are related to a business object or business objects. The user can execute an action, for example, by selecting the indication of the action in the action display space, to obtain information on the contextually related documents, business objects, and users. For example, selecting the "Sales report for Line A" action may cause the retrieval of the business object for the Line A sales report from the appropriate business application database and the display of the report of the sales for Line A. As another example, selecting the "Calendar for October $9^{th}$-$13^{th}$" action may cause the retrieval of the user's schedule for October $9^{th}$-$13^{th}$ from the user's calendaring application and the display the user's schedule for October $9^{th}$-$13^{th}$. The task display space includes indications of the work-flow tasks that are associated with the document category into which the email message is classified. The user can execute a work-flow task, for example, by selecting the indication of the work-flow task in the task display space. For example, selecting the "Generate vendor record for Line D" task may cause the creation of a vendor record for Line D in the appropriate business application database. The actions and the work-flow tasks are contextually related to the email message. The context of the actions and work-flow tasks are referred to in the email message. For example, the context of the action "Sales report for Line B" may have been determined from the terms "selling" and "Line B" in the email message. As another example, "Bee Curtis" may be a sales representative for ACME Company, and the context for the action to display Bee's contact information (i.e., the action "Bee Curtis, Sales Rep . . . ") may have been determined from "acme.com" in the header of the email message.

Figure 3:
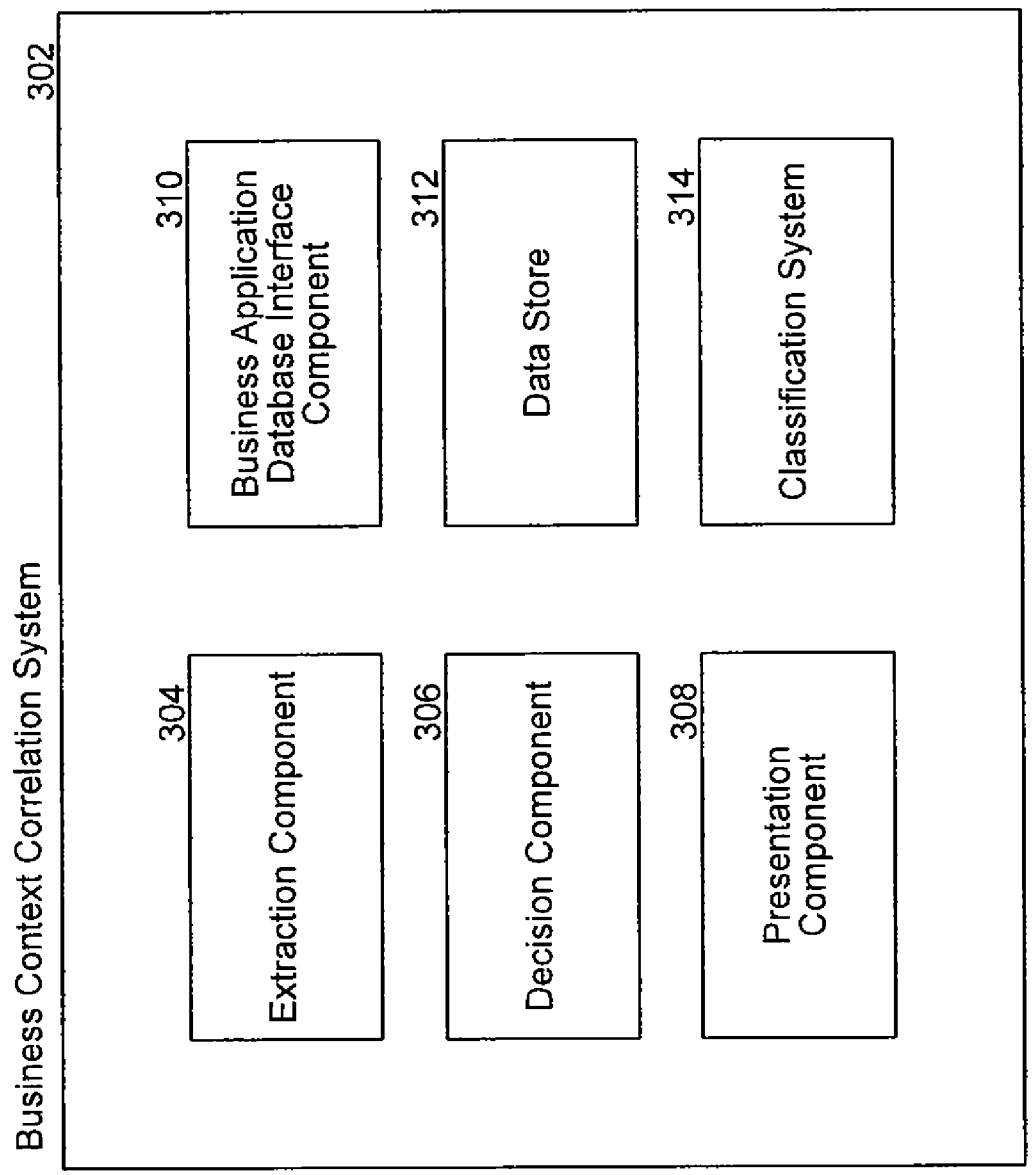
FIG. 3 is a block diagram illustrating selected components of the business context correlation system, according to some embodiments.

FIG. 3 is a block diagram illustrating selected components of the business context correlation system, according to some embodiments. A business context correlation system 302 comprises an extraction component 304, a decision component 306, a presentation component 308, a business application database interface component 310, a data store 312, and a classification system 314. The data store contains the master dictionary of terms and the other information and data used by the business context correlation system to provide business context corresponding to unstructured documents. The extraction component extracts the relevant terms from the unstructured documents. The business application database interface component provides an interface to the business application database or databases, and facilitates interaction with the business application databases. The classification system contains the set of classifiers that correspond to the defined actions and document categories. The classifiers classify the relevant terms by mapping the relevant terms into yes/no decisions on whether the corresponding actions or document categories apply to the unstructured document. The decision component uses the classifiers in the classification system to classify the relevant terms of the unstructured document, identifies the actions and work-flow tasks to present, and determines the values for the parameters needed by the actions and work-flow tasks. The presentation component provides the presentation of the actions and work-flow tasks to the user for possible execution. The aforementioned components of the business context correlation system are only illustrative and are not intended to suggest any limitation as to the implementation of the illustrated components and/or the scope of use or functionality of the business context correlation system. For example, the classification system may be implemented as a subcomponent of the decision component.

The computing device on which the business context correlation system is implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the business context correlation system. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the business context correlation system may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The business context correlation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
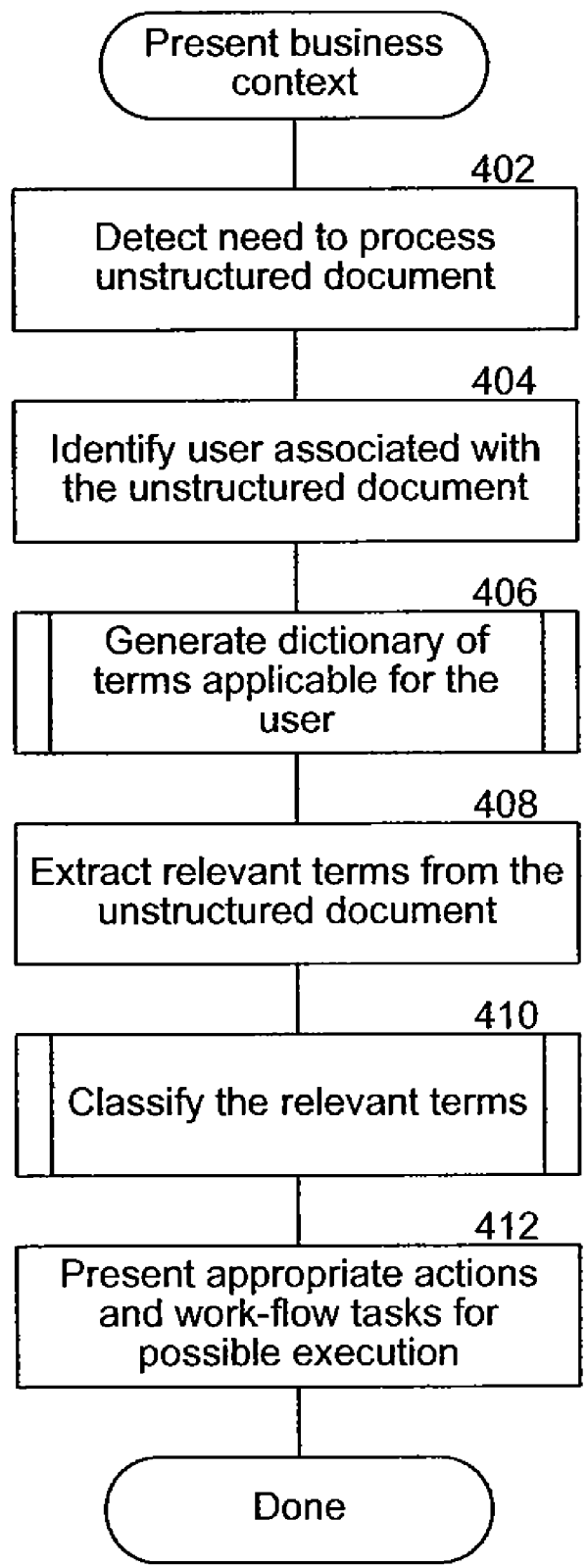
FIG. 4 is a flow diagram that illustrates the processing of the business context correlation system to present business context corresponding to an unstructured document, according to some embodiments.

FIG. 4 is a flow diagram that illustrates the processing of the business context correlation system to present business context corresponding to an unstructured document, according to some embodiments. By way of example, the business context correlation system may be executing in conjunction with a client email application and providing users business context along with their email messages. In block 402, the business context correlation system detects the need to process an email message. Continuing the example, when a user selects an email message to view, the client email application may pass an indication of or a copy of the selected email message to the business context correlation system for processing. In block 404, the business context correlation system identifies the user associated with the email message. Continuing the example, the user may be the person who selected the email message for viewing. In block 406, the business context correlation system generates a dictionary of terms that is applicable for the user, for example, from a master dictionary of terms. The business context correlation system may periodically, for example, once a day, etc., generate the master dictionary of terms, and store the generated master dictionary of terms for subsequent use until being replaced by a subsequently generated master dictionary of terms. The business context correlation system may also store the generated dictionary of terms applicable for the user for subsequent use. For example, the business context correlation system may generate a dictionary of terms applicable for the user once when the user first logs on to the email application, and use this dictionary of terms for the duration of the user's log on session with the email application. In this case, most of the computation for generating the dictionary of terms that is applicable for the user would be executed before the need to process an email is detected (before block 402), and block 406 would simply select a pre-computed dictionary of terms. In block 408, the business context correlation system extracts the relevant terms from the email message, for example, using the dictionary of terms that was generated for the user. In block 410, the business context correlation system classifies the relevant terms to identify the actions and work-flow tasks to suggest to the user for execution. The identified actions and work-flow tasks provide the business context to the email message. In block 412, the business context correlation system presents the appropriate actions and work-flow tasks to the user for possible execution, and then completes. In some embodiments, the business context correlation system may filter the actions and work-flow tasks identified in block 410 based on characteristics of the user, such as the user's role, title, gender, age, locale region, etc., to identify the actions and work-flow tasks that may be more applicable to the user. In this way, the business context correlation system can provide the user higher user satisfaction.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 5:
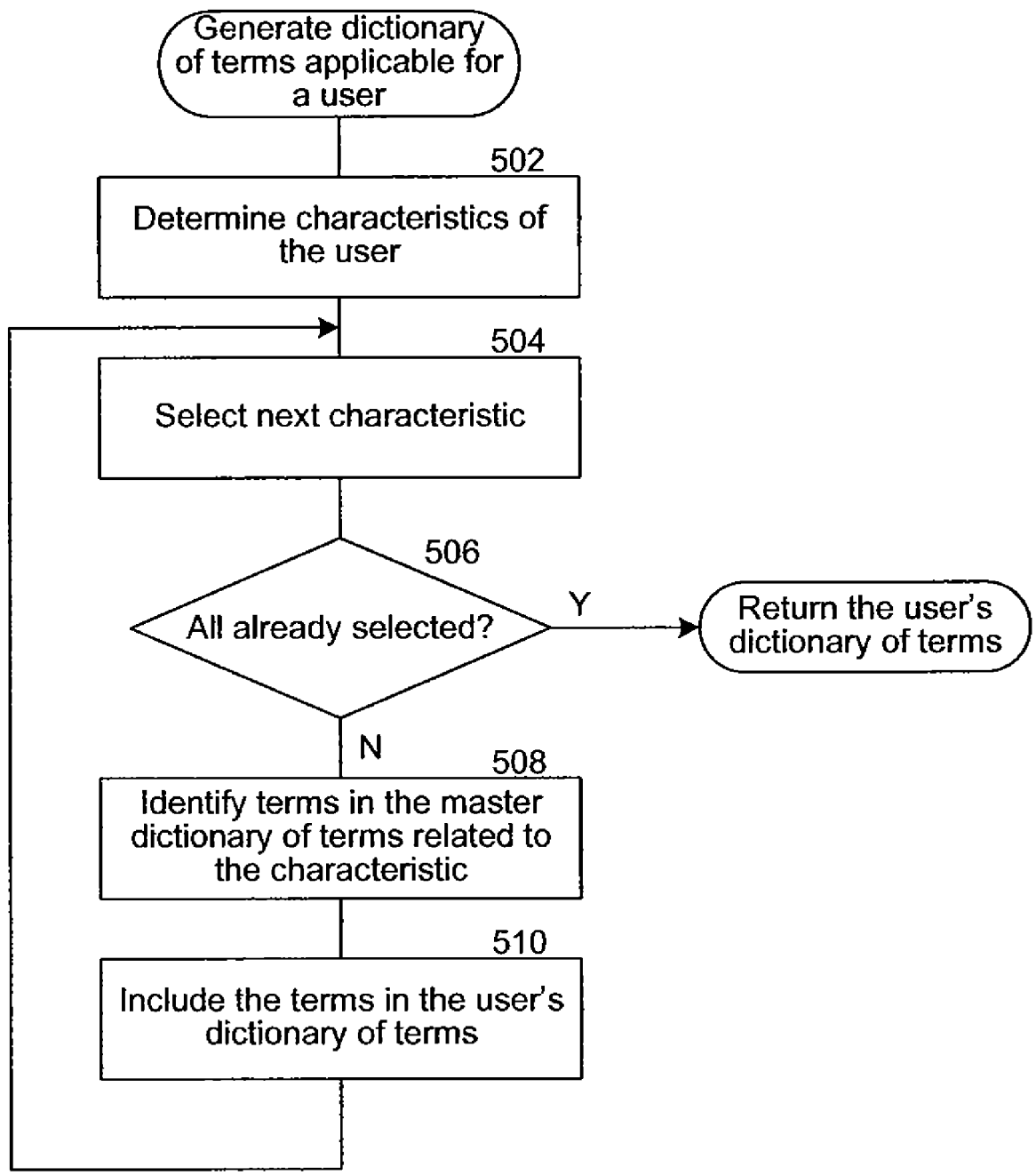
FIG. 5 is a flow diagram that illustrates the processing of the business context correlation system to generate a dictionary of terms applicable for a user, according to some embodiments.

FIG. 5 is a flow diagram that illustrates the processing of the business context correlation system to generate a dictionary of terms applicable for a user, according to some embodiments. In block 502, the business context correlation system determines the characteristics of the user. The characteristics may include the user's role/title/profession, vertical industry, gender, age, residence locale, interests, etc. In block 504, the business context correlation system selects the next user characteristic to process. In decision block 506, if all of the user's characteristics have already been selected (i.e., processed), then the business context correlation system returns the user's dictionary of terms, else the business context correlation system continues at block 508. In block 508, the business context correlation system identifies the terms in the master dictionary of terms that are related to (i.e., appropriate for) the user characteristic. In some instances, the master dictionary of terms may not include any terms that are related to the particular user characteristic. In block 510, the business context correlation system includes the identified terms from the master dictionary of terms in the user's dictionary of terms. The business context correlation system then loops to block 504 to select the next user characteristic to process.

Figure 6:
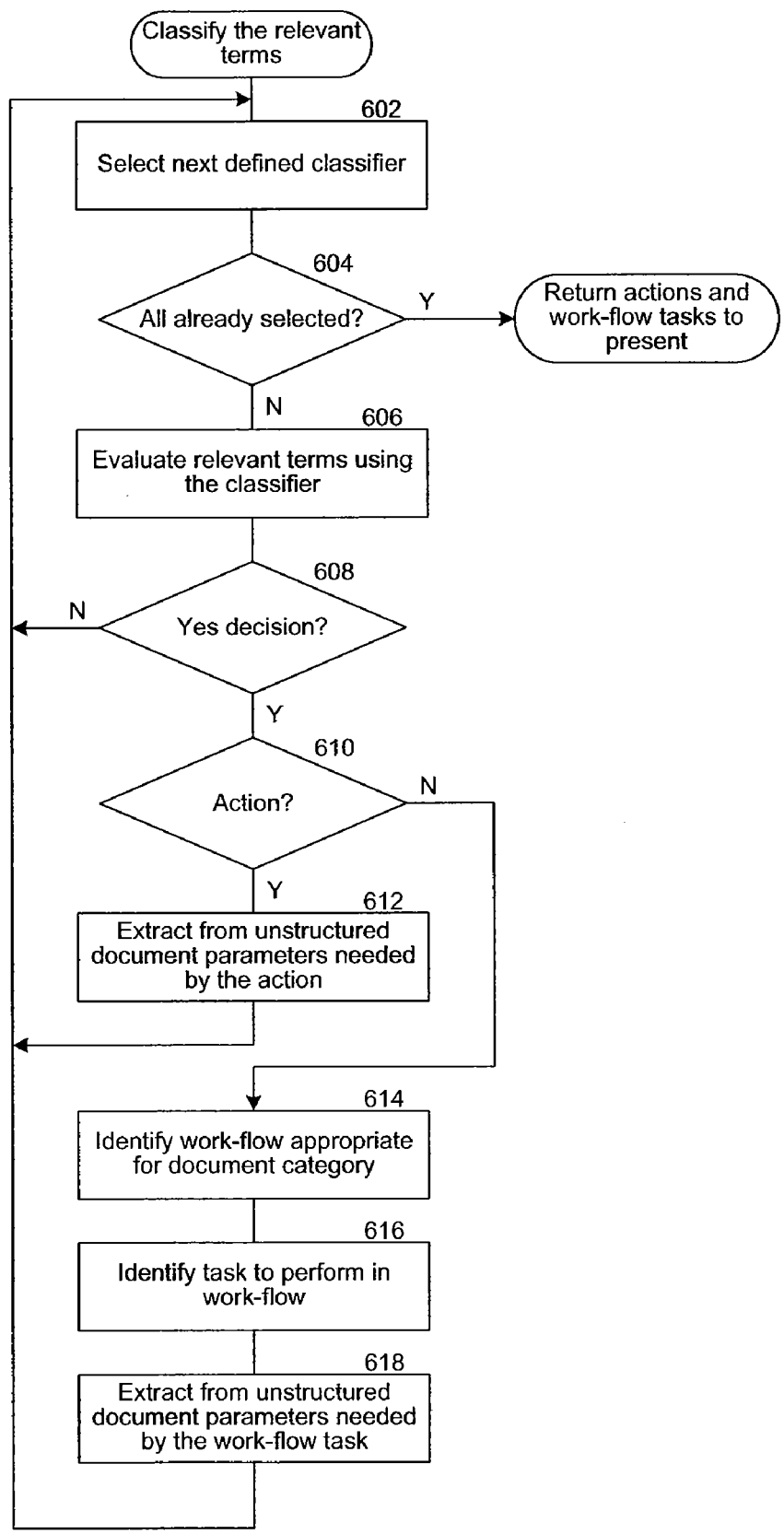
FIG. 6 is a flow diagram that illustrates the processing of the business context correlation system to classify the relevant terms, according to some embodiments.

FIG. 6 is a flow diagram that illustrates the processing of the business context correlation system to classify the relevant terms, according to some embodiments. The relevant terms from the unstructured document are classified to identify the actions and the work-flow tasks that are contextually related to the unstructured document. In block 602, the business context correlation system selects the next defined classifier. In decision block 604, if all of the defined classifiers have already been selected (i.e., processed), then the business context correlation system returns a list of the actions and work-flow tasks to present for execution, else the business context correlation system continues at block 606. In block 606, the business context correlation system inputs the relevant terms into the classifier for evaluation. In decision block 608, if the evaluation of the relevant terms result in a "yes" decision from the classifier, then the business context correlation system continues at decision block 610, else the business context correlation system loops to block 602 to select the select the next defined classifier. A yes decision from the classifier indicates that the corresponding action or document category applies to the unstructured document. The business context correlation system may require that the classifier meet or exceed a predetermined threshold before resulting in a "yes" decision. Methods for the evaluation of classifier outputs (for algorithms such a linear support vector machines, Naïve Bayes classifiers, boosted decision trees, etc.) is known in the art. In decision block 610, if the classifier corresponds to an action, then the business context correlation system continues at block 612, else the business context correlation system continues at block 614. In block 612, the business context correlation system extracts from the unstructured document any parameters that are needed by the action. The parameters provide the context around the action. Having extracted the parameters needed by the action, the business context correlation system loops to block 602 to select the next defined classifier. In block 614, the business context correlation system identifies the work-flow process that is appropriate for the document category. In block 616, the business context correlation system identifies the task to perform in the work-flow process. The business context correlation system may identify the task in the work-flow process by analyzing the state(s) of the business application(s). for example, assuming that the work-flow process involves (1) sending a brochure to a prospective customer, and (2) following up by contacting the prospective customer, and the state of the business application indicates that the brochure has been sent but the follow-up contact with the prospective customer has not been made, then the business context correlation system identifies the task to contact the prospective customer as the task that needs to be performed. The business context correlation system may identify multiple tasks in the work-flow process. Alternatively, the business context correlation system may not identify any task in the work-flow process, for example, if the state of the business application indicates that all of the tasks have been performed. In block 618, the business context correlation system extracts from the unstructured document any parameters that are needed by the work-flow task. The parameters provide the context around the work-flow task. Having extracted the parameters needed by the work-flow task, the business context correlation system loops to block 602 to select the select the next defined classifier.

Figure 7:
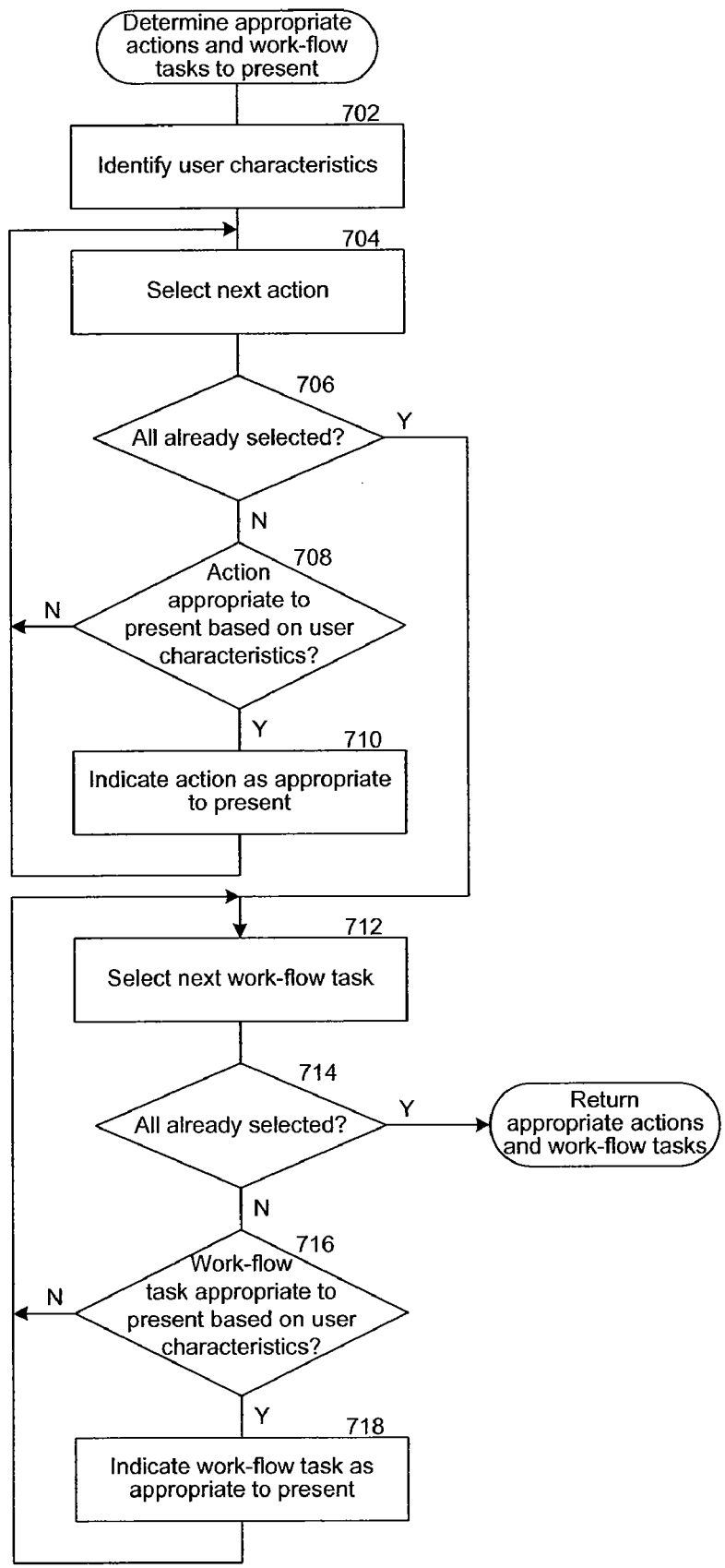
FIG. 7 is a flow diagram that illustrates the processing of the business context correlation system to determine the appropriate actions and work-flow tasks to present, according to some embodiments.

FIG. 7 is a flow diagram that illustrates the processing of the business context correlation system to determine the appropriate actions and work-flow tasks to present, according to some embodiments. The business context correlation system may further filter the actions and tasks which have been identified based on the evaluation of the classifiers in order to identify the actions and/or work-flow tasks that are more appropriate to suggest to the user based on the user's characteristics. In block 702, the business context correlation system identifies the user characteristics that are to be used as the filters. In block 704, the business context correlation system selects the next action that has been identified using the classifiers for presenting to the user for possible execution. In decision block 706, if all of the actions have already been selected (i.e., processed), then the business context correlation system continues at block 712, else the business context correlation system continues at decision block 708. In decision block 708, if the action is appropriate to present to the user based on the user characteristics, then the business context correlation system continues at block 710, else the business context correlation system loops to block 704 to select the next action that has been identified using the classifiers. In block 710, the business context correlation system indicates the action as being appropriate to present to the user for possible execution. Having indicated that the action is appropriate for presentation to the user, the business context correlation system loops to block 704 to select the next action that has been identified using the classifiers. In block 712, the business context correlation system selects the next work-flow task that has been identified using the classifiers for presenting to the user for possible execution. In decision block 714, if all of the work-flow tasks have already been selected (i.e., processed), then the business context correlation system returns the list of appropriate actions and work-flow tasks (i.e., the actions and work-flow task which have further been filtered based on the user characteristics), else the business context correlation system continues at decision block 716. In decision block 716, if the work-flow task is appropriate to present to the user based on the user characteristics, then the business context correlation system continues at block 718, else the business context correlation system loops to block 712 to select the next work-flow task that has been identified using the classifiers. In block 718, the business context correlation system indicates the work-flow task as being appropriate to present to the user for possible execution. Having indicated that the work-flow task is appropriate for presentation to the user, the business context correlation system loops to block 712 to select the next work-flow task that has been identified using the classifiers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the business context correlation system has in numerous instances been described as working in conjunction with an email application classifying email messages and relevant terms extracted from email messages, the business context correlation system can is not limited to working in conjunction with email applications or classifying email messages. For example, the business context correlation system can work in conjunction with other applications, such as presentation applications, word processing applications, conferencing applications, and other applications that allow processing of unstructured documents. Moreover, the business context correlation system can classify other types of unstructured documents, such as a document containing an instant messaging (IM) message or messages, a document containing a transcription of a telephone conversation, a slide in a slide deck, as well any other document containing unstructured contents. Accordingly, the invention is not limited except as by the appended claims.

We claim:

1. A computer-implemented method in a computer system with a processor for presenting a user business context corresponding to an unstructured document, the method comprising:

providing classifiers for classifying terms of unstructured documents into actions with parameters representing business objects derived from the unstructured documents, each classifier having been trained with training data of terms extracted from the unstructured documents and associated actions associated with the unstructured documents of the training data, a business object including a customer having a customer name;

providing a business application database storing business information relating to different types of business objects;

providing a tailored dictionary derived from a master dictionary of names of business objects and other business-related terms, the tailored dictionary containing terms of the master dictionary determined, based on characteristics of the user, to be more relevant to the user than other terms of the master dictionary, a characteristic of the user including job title of the user;

receiving an unstructured document;

extracting by the processor relevant terms from the received unstructured document that are in the provided tailored dictionary;

applying by the processor the provided classifiers to the extracted relevant terms to classify the relevant terms extracted from the received unstructured document into a plurality of actions related to a business object associated with a business application, at least some of the plurality of the actions having a parameter identifying the business object, each classifier providing a score associated with each of the plurality of actions;

identifying which of the plurality of actions have scores that satisfy a predetermined threshold score;

extracting from the unstructured document a parameter identifying the business object;

retrieving from the business application database business information of the business object to which the received unstructured document relates;

presenting to a user the unstructured document, an indication of each identified action along with its score for possible performance, and the retrieved business information of the business object to which the received unstructured document relates, wherein an action is performed using the extracted parameter; and receiving from the user an indication to modify an identified action and to perform the modified identified action so that the user can view the received unstructured document, the retrieved business information, and the score of each identified action to assist the user in deciding whether to modify and effect performance of an identified action.

2. The method of claim 1, wherein the unstructured document is an email message.

3. The method of claim 1, wherein the unstructured document is an IM message.

4. The method of claim 1, wherein the unstructured document is a transcribed telephone conversation.

5. The method of claim 1, wherein the at least one relevant term of the extracted relevant terms is extracted from the unstructured document using natural language processing.

6. The method of claim 1, further comprising:
determining whether the at least one action is appropriate to present based on one or more characteristics of the user; and
presenting the at least one action to the user upon determining that the at least one action is appropriate to present based on one or more characteristics of the user.

7. The method of claim 1, further comprising:
classifying the relevant terms extracted from the unstructured document into at least one document category;
identifying a work-flow process associated with the document category;
identifying a task to perform in the work-flow process; and
presenting the work-flow task to the user for possible execution.

8. The method of claim 7, wherein the work-flow task is related to a business object associated with a business application.

9. A computer-readable media encoded with computer executable instructions for controlling a computer system to present a user business context corresponding to an unstructured document, the computer-readable media including a storage device, by a method comprising:
accessing a tailored dictionary derived from a master dictionary of names of business objects and other business-related terms, the tailored dictionary containing terms of the master dictionary determined, based on characteristics of the user, to be more relevant to the user than other terms of the master dictionary, a characteristic of the user including job title of the user;
providing classifiers for classifying the unstructured document into document categories, each classifier having been trained with terms of the tailored dictionary extracted from unstructured documents and document categories associated with the unstructured documents;
providing an indication of work-flow processes associated with each category;
providing a business application database storing business information relating to different types of business objects;
receiving an unstructured document;
extracting one or more relevant terms of the tailored dictionary from the received unstructured document;
applying the provided classifiers to the extracted relevant terms to classify the relevant terms extracted from the unstructured document into a plurality of document categories, each document category having a score;
identifying from the provided indication of work-flow processes a work-flow process associated with the document category;
identifying a task to perform in the work-flow process;
extracting a parameter from the received unstructured document that identifies a business object;
retrieving from the business application database business information associated with the identified business object; and
presenting to the user the unstructured document, the retrieved business information, and for each document category with a score above a predetermined threshold score, the work-flow task for that document category for possible execution, wherein the work-flow task is associated with the extracted parameter.

10. The computer-readable media of claim 9, wherein the document category is a sales opportunity.

11. The computer-readable media of claim 9, wherein the document category is a request for information.

12. The computer-readable media of claim 9, wherein the document category is a customer issue.

13. The computer-readable media of claim 9, further comprising:
determining whether the work-flow task is appropriate to present based on one or more characteristics of the user; and
presenting the work-flow task to the user upon determining that the at least one action is appropriate to present based on one or more characteristics of the user.

14. The computer-readable media of claim 9, further comprising:
classifying the relevant terms extracted from the unstructured document into at least one action related to a business object associated with a business application; and
presenting the at least one action to the user for possible execution.

15. The computer-readable media of claim 14, further comprising:
determining whether the at least one action is appropriate to present based on one or more characteristics of the user; and
presenting the at least one action to the user upon determining that the at least one action is appropriate to present based on one or more characteristics of the user.

16. A business context correlation system with a processor and a memory, comprising:
a tailored dictionary derived from a master dictionary of names of business objects and other business-related terms, the tailored dictionary containing terms of the master dictionary determined, based on characteristics of a user, to be more relevant to the user than other terms of the master dictionary, a characteristic of the user including job title of the user;
classifiers for classifying terms of unstructured documents into actions with parameters representing business objects derived from the unstructured documents, each classifier providing a score and having been trained with terms of the tailored dictionary extracted from the unstructured documents and associated actions associated with the unstructured documents;

a business application database associated with a business application storing business information relating to business objects;

a component that extracts relevant terms from an unstructured document associated with a business object;

a component that classifies using the classifiers the relevant terms extracted from the unstructured document into a plurality of actions related to the business object associated with the unstructured document;

a component that extracts a parameter from the unstructured document identifying the business object;

a component that retrieves from the business application database business information for the business object identified by the parameter; and a component that presents to a user the unstructured document, the business information, and for each of the plurality of actions with a score above a predetermined threshold score, the action along with its score for possible execution in reference to the business object identified by the extracted parameter wherein the classifiers and components are implemented as computer-executable instructions stored in the memory for execution by the processor.

17. The system of claim 16, further comprising:

a component that classifies the relevant terms extracted from the unstructured document into at least one document category;

a component that identifies a work-flow process associated with the document category;

a component that identifies a task to perform in the work-flow process; and a component that presents the work-flow task for possible execution.

* * * * *

UNITED STATES PATENT AND TRADEMARK OFFICE
CERTIFICATE OF CORRECTION

| | | |
|---|---|---|
| PATENT NO. | : 7,634,467 B2 | Page 1 of 1 |
| APPLICATION NO. | : 11/555228 | |
| DATED | : December 15, 2009 | |
| INVENTOR(S) | : Patricia A. Ryan et al. | |

It is certified that error appears in the above-identified patent and that said Letters Patent is hereby corrected as shown below:

In column 13, line 27, in Claim 5, after "wherein" delete "the".

Signed and Sealed this
First Day of February, 2011

David J. Kappos
*Director of the United States Patent and Trademark Office*